UNITED STATES PATENT OFFICE.

HUGO HOFFMANN, OF BERLIN, GERMANY.

PROCESS OF PREPARING KOLA POWDER.

SPECIFICATION forming part of Letters Patent No. 508,015, dated November 7, 1893.

Application filed October 18, 1892. Serial No. 449,277. (No specimens.)

*To all whom it may concern:*

Be it known that I, HUGO HOFFMANN, a subject of the Emperor of Germany, residing at 81 Belle-Alliance Strasse, Berlin, in the Kingdom of Prussia and German Empire, have invented a new and useful Process for the Removal of Bitterness from Kola-Nut Powder, of which the following is a specification.

This invention relates to the preparation of a powder from certain kola nuts for use in the production of a beverage, and as a substitute for cocoa, and has for its object the removal of the bitter taste therefrom, such acerbity being due to the tannins which it contains.

The removal of bitterness from the kola nut powder has hitherto been commonly effected by treating it with dilute alkaline solutions, which resulted in the absorption by the tannins present in the powder, of oxygen from the atmosphere. This treatment however besides occupying considerable time is open to the objection that the alkalies employed not only act upon the tannins present in the powder but also upon its other constituents whereby there are formed, among others, the following substances,—gallic acid and carbonate of potassium, whose presence in the powder imparts to it an earthy taste and also a dirty dark brown color unlike the natural color of cocoa.

According to this invention the removal of bitterness from kola-nut powder is effected by treating it with peroxide of hydrogen, the well known property of which, viz, to part with its oxygen very easily, being taken advantage of. Unlike the dilute alkaline solutions before mentioned, peroxide of hydrogen acts upon the tannins only of the kola-nut powder, the chemical action being that the oxygen liberated therefrom combines with a portion of the carbons of the tannins, whereby the latter are transformed into sweet compounds whose presence therefore in the kola-nut powder tends to improve its flavor. At the same time the natural color of the powder is not appreciably altered.

In carrying out my invention, the powder obtained from the slightly roasted kola nut is moistened with water and to this is added about ten per cent. of peroxide of hydrogen. In consequence of the action of the peroxide upon the tannin the temperature of the mixture rises to 35° centigrade and a portion of the oxygen of the peroxide of hydrogen combines with a corresponding quantity of the carbon of the tannins, and carbonic acid gas, water, and sweet compounds are formed. The reaction is completed within four to six hours, as it is not dependent upon the supply of oxygen from the air, as in the alkali process before mentioned, while at the same time the peroxide of hydrogen does not act detrimentally upon the theobromine or the caffeine of the powder. The resultant pulp is then dried by slow heat at a temperature of 25° to 30° centigrade, and made into a fine powder, which can be used immediately as a substitute for cocoa or as a basis for all goods manufactured therefrom. It has been found that other oxidizing agents, behaving like peroxide of hydrogen may be used in the same way, as mentioned above, for instance ozone and ozonized water, which act in a similar manner upon the tannins of kola nut powder.

What I claim, and desire to secure by Letters Patent of the United States, is—

The herein described process for the removal of bitterness from kola-nut powder, which consists in moistening the same with water then combining the moistened powder with peroxide of hydrogen, and finally drying the resultant pulp and reducing the same to a powder, substantially as described.

HUGO HOFFMANN.

Witnesses:
PAUL FISCHER,
PAUL BRINKMANN.